(12) United States Patent
Hauser et al.

(10) Patent No.: US 12,361,576 B2
(45) Date of Patent: Jul. 15, 2025

(54) PROXIMITY SENSING USING STRUCTURED LIGHT

(71) Applicant: Apple Inc., Cupertino, CA (US)

(72) Inventors: Jonathan Hauser, Ramat Gan (IL); Assaf Avraham, Givatayim (IL); Dror Leshem, Maale Efraim (IL); Refael Della Pergola, Jerusalem (IL); Shay Keren-Zur, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 491 days.

(21) Appl. No.: 17/885,573

(22) Filed: Aug. 11, 2022

(65) Prior Publication Data

US 2023/0073962 A1 Mar. 9, 2023

Related U.S. Application Data

(60) Provisional application No. 63/241,002, filed on Sep. 6, 2021.

(51) Int. Cl.
G06T 7/521 (2017.01)
G06T 7/73 (2017.01)

(52) U.S. Cl.
CPC .............. *G06T 7/521* (2017.01); *G06T 7/74* (2017.01)

(58) Field of Classification Search
None
See application file for complete search history.

(56) References Cited

U.S. PATENT DOCUMENTS

| | | | |
|---|---|---|---|
| 8,384,997 B2 | 2/2013 | Shpunt et al. | |
| 8,456,517 B2 | 6/2013 | Spektor et al. | |
| 10,303,866 B1* | 5/2019 | Van Os | G06V 40/171 |
| 2020/0015899 A1 | 1/2020 | Scheib et al. | |
| 2020/0289216 A1 | 9/2020 | Denlinger et al. | |
| 2021/0165098 A1* | 6/2021 | Kimura | G01S 17/89 |

OTHER PUBLICATIONS

Alnahhas et al., U.S. Appl. No. 17/549,917, filed Dec. 14, 2021.

* cited by examiner

*Primary Examiner* — James M Anderson, II
(74) *Attorney, Agent, or Firm* — Meitar Patents Ltd.; Daniel Kligler

(57) ABSTRACT

Sensing apparatus includes a projector, which projects toward a target a pattern of spots extending over a predefined angular range about a projection axis. An imaging assembly includes an image sensor and objective optics, which form on the image sensor an image of the target along an imaging axis, which is offset transversely relative to the projection axis. A processor is configured to process signals output by the image sensor so as generate, while the target is within a first span of distances from the apparatus, a depth map of the target responsively to shifts of the spots in the image, and to estimate, while the target is within a second span of distances, nearer to the apparatus than the first span, a distance to the target from the apparatus by detecting in the image a part of the pattern located at an edge of the angular range.

16 Claims, 9 Drawing Sheets

PROXIMITY SENSING USING STRUCTURED LIGHT

CROSS-REFERENCE TO RELATED APPLICATION

This application claims the benefit of U.S. Provisional Patent Application 63/241,002, filed Sep. 6, 2021, which is incorporated herein by reference.

FIELD OF THE INVENTION

The present invention relates generally to depth sensing, and particularly to devices and methods for proximity sensing.

BACKGROUND

Many depth mapping systems (also referred to as 3D mapping or 3D imaging systems) use projected patterns of structured light. In these systems, a pattern of light is projected onto a target scene, and an image of the scene is captured and processed in order to detect local shifts of the pattern in the image relative to a reference pattern. (The terms "light" and "optical radiation" are used interchangeably in the present description and in the claims to refer to electromagnetic radiation in any of the visible, infrared, and ultraviolet ranges.) The 3D surface coordinates of objects in the scene are derived by triangulation from the local shifts. A depth mapping system of this sort is described, for example, in U.S. Pat. No. 8,456,517, whose disclosure is incorporated herein by reference.

Some structured-light depth mapping systems use diffractive optical elements (DOEs) in creating and projecting a pattern of spots. For example, U.S. Pat. No. 8,384,997, whose disclosure is incorporated herein by reference, describes an optical pattern projector in which first and second DOEs are arranged in series to diffract an input beam of radiation. The first DOE is configured to apply to the input beam a pattern with a specified divergence angle, while the second DOE is configured to split the input beam into a matrix of output beams with a specified fan-out angle. The divergence and fan-out angles are chosen so as to project the radiation onto a region in space in multiple adjacent instances of the pattern.

The term "proximity sensing" refers to detecting the presence of an object close to (but not touching) the proximity sensor. The meaning of "close" in relation to proximity sensing depends on the application. In the context of the present description and in the claims, the term "proximity sensing" means sensing the presence of an object within a range of 100 mm or less from the sensor. Proximity sensing may also include depth sensing over at least a part of this range, i.e., estimating the distance from the sensor to nearby objects.

SUMMARY

Embodiments of the present invention that are described hereinbelow provide improved devices and methods for proximity sensing.

There is therefore provided, in accordance with an embodiment of the invention, sensing apparatus, including a projector, which is configured to project toward a target a pattern of spots extending over a predefined angular range about a projection axis. An imaging assembly includes an image sensor and objective optics, which are configured to form on the image sensor an image of the target along an imaging axis, which is offset transversely relative to the projection axis. A processor is configured to process signals output by the image sensor so as generate, while the target is within a first span of distances from the apparatus, a depth map of the target responsively to shifts of the spots in the image, and to estimate, while the target is within a second span of distances, nearer to the apparatus than the first span, a distance to the target from the apparatus by detecting in the image a part of the pattern located at an edge of the angular range.

In some embodiments, the processor is further configured to detect, when the pattern is absent from the image, that the target is located within a third span of distances, nearer to the apparatus than the second span. In one embodiment, within the second span of the distances, the image contains bars formed by the spots projected onto the target, and the processor is configured to detect whether the target is in the second span or the third span of the distances responsively to a presence or absence of the bars in the image.

In a disclosed embodiment, the projector includes a diffractive optical element (DOE), and the spots correspond to respective diffraction orders of the DOE.

In some embodiments, the processor is configured to find, responsively to the detected part of the pattern, a location of the edge of the angular range in the image, and to estimate the distance to the target within the second span responsively to the location of the edge. In a disclosed embodiment, the processor is configured to find the location of the edge by identifying one or more local extrema in an intensity profile of the image. Additionally or alternatively, the processor is configured to estimate the distance by a process of triangulation based on the location of the edge in the image and an offset between the projection axis and the imaging axis.

In further embodiments, the processor is configured to store reference data indicating respective expected locations in the image of the spots at the edge of the angular range for each of a plurality of values of the distance within the second span, and to estimate the distance to the target within the second span by matching actual locations of the spots in the image of the pattern to the expected locations of the spots in the stored reference data. In some embodiments, the processor is configured to find respective displacements between the actual locations and the expected locations of each of the spots for two or more of the values of the distance of the reference data, and to select a value of the distance to the target responsively to the respective displacements. In a disclosed embodiment, the processor is configured to compute respective scores for the two or more of the values of the distance based on the respective displacements, and to choose the value of the distance, responsively to the respective scores, at which the expected locations of the spots optimally match the actual locations.

Additionally or alternatively the imaging axis is offset relative to the projection axis along a baseline direction, and the spots in the projected pattern are arranged along rows that are angled obliquely relative to the baseline direction.

There is also provided, in accordance with an embodiment of the invention, a method for sensing, which includes projecting from a projector toward a target a pattern of spots extending over a predefined angular range about a projection axis. An image of the target is captured along an imaging axis, which is offset transversely relative to the projection axis. The image is processed so as generate, while the target is within a first span of distances of the projector, a depth map of the target responsively to shifts of the spots in the image, and to estimate, while the target is within a second span of distances, nearer to the projector than the first span, a distance to the target by detecting in the image a part of the pattern located at an edge of the angular range.

The present invention will be more fully understood from the following detailed description of the embodiments thereof, taken together with the drawings in which:

DETAILED DESCRIPTION OF EMBODIMENTS

Overview

Figure 1:
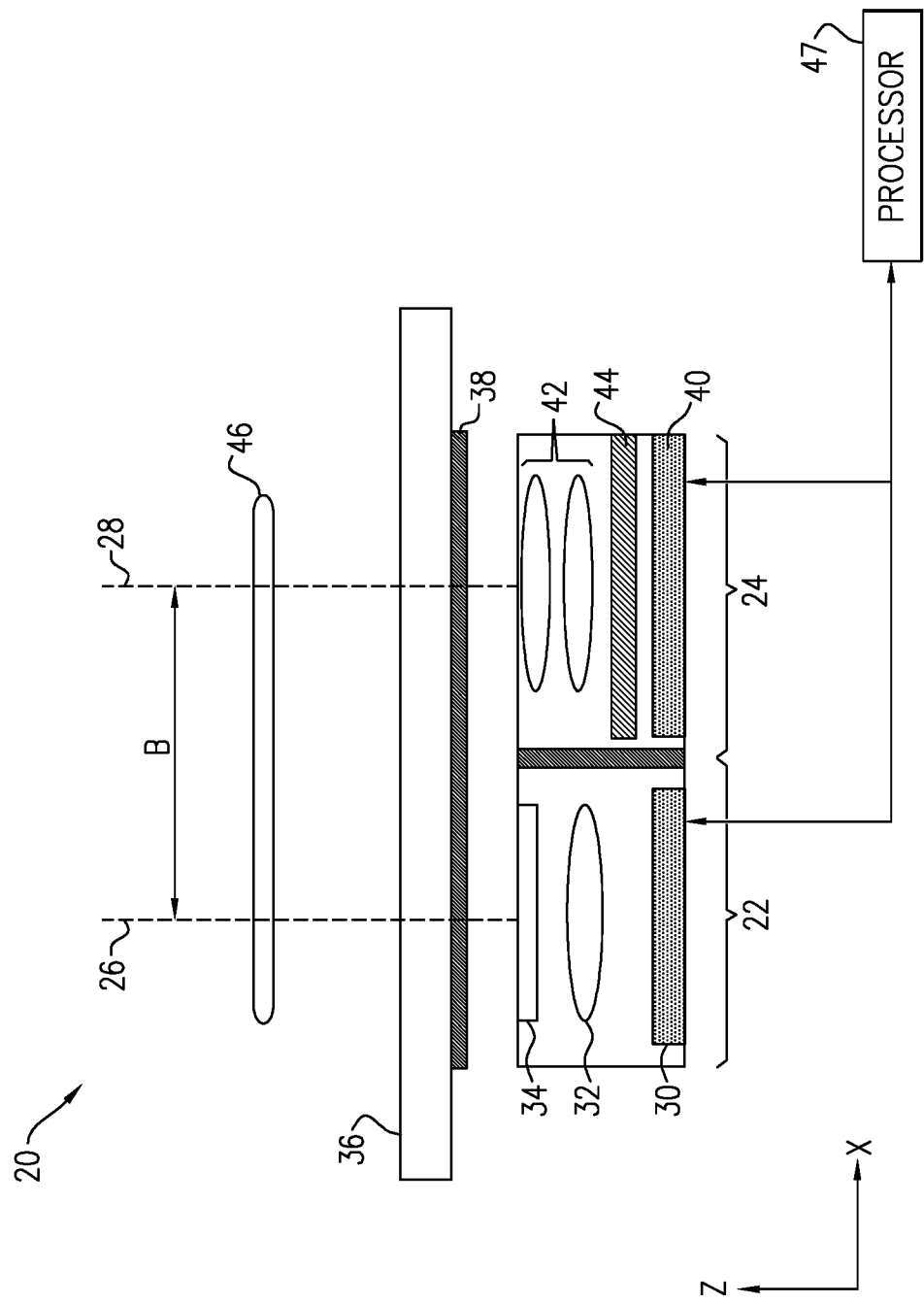
FIG. 1 is a schematic side view of apparatus for depth and proximity sensing, in accordance with an embodiment of the invention.

Many mobile devices, such as smartphones, include a depth mapping module, which is used, for example, in recognizing the face of the user of the device. Such modules typically operate by projecting a pattern of structured light toward a target and detecting shifts of the pattern in an image of the target. This sort of pattern-based depth mapping is typically effective over a certain span of distances, for example between 10 cm and 1 m from the device, depending on the design of the pattern projector and imaging optics.

Mobile devices also use proximity sensing to detect objects in close proximity to the device, within a span of distances that is typically shorter than the working range of the depth mapping module. A proximity sensor may be used, for example, to detect when a smartphone is being held close to the user's face in order to avoid accidental operation of the touchscreen during a telephone conversation. For this purpose, mobile devices comprise proximity sensors of various types, in addition to the depth mapping module and/or other cameras on the front side of the device. These multiple sensing functions increase the size and cost of the mobile device and reduce the area available for image display.

Embodiments of the present invention that are described herein combine the depth mapping and proximity sensing functions of a mobile device in a single module. The device projects a pattern of spots for purposes of depth mapping over a certain span of distances. The present embodiments use features of this same projected pattern in estimating the distance to a target (or at least the presence of a target) in a span that is nearer to the device than the depth mapping span, by applying novel processing algorithms to defocused images of such targets that are captured by the depth mapping module. Thus, the present embodiments extend the useful range of existing depth mapping modules to much shorter ranges at little or no added hardware cost and thus obviate the need for a separate proximity sensor. Although these embodiments are directed particularly to the needs of compact mobile devices, the principles of the present invention may similarly be used in other applications of structured-light depth mapping.

In the disclosed embodiments, sensing apparatus comprises a projector, which projects a pattern of spots toward a target. The pattern extends over a predefined angular range about a projection axis. An imaging assembly comprises an image sensor and objective optics, which form an image of the target on the image sensor. The imaging axis of the objective optics is offset transversely relative to the projection axis. A processor processes that signals that are output by the image sensor so as generate a depth map of the target, as long as the target is within a certain span of distances from the apparatus. This span is referred to herein as the mapping span, and typically comprises a range of distances over which the spots of the pattern extend across the target and are sharply focused in the image, so that the processor can compute depth coordinates of the target based on the shifts of the spots in the image.

When the target is within a shorter span of distances, i.e., nearer to the apparatus than the depth mapping span, the processor applies other criteria in sensing the location of the target. This shorter span is referred to herein as the proximity sensing span. In at least a part of this shorter span, the processor estimates the distance to the target from the apparatus by detecting in the image a part of the spot pattern that is located at the edge of the angular range of the pattern. The spots in the image in this case are typically not well focused, and the processor therefore applies other algorithms, as described in detail hereinbelow, in finding the spot locations and translating these locations into a distance estimate. When the target is within the closest part of the proximity sensing span, the pattern of spots may be absent from the image, and the processor uses this absence (along with other criteria) in inferring that the target is nearby.

SYSTEM DESCRIPTION

FIG. 1 is a schematic side view of a device 20 for depth and proximity sensing, in accordance with an embodiment of the invention. Device 20 comprises a light source, identified as a transmitting (Tx) laser projector 22, and a receiving (Rx) camera 24, with respective optical axes 26 and 28 that are offset transversely by a baseline offset B. The baseline is assumed, for the sake of convenience, to extend along the X-axis, as shown in the figures.

Tx laser projector 22 comprises an emitter 30 comprising one or more lasers, such as a vertical-cavity surface-emitting laser (VCSEL) or an array of VCSELs, which emits one or more beams of light. Collimating optics 32 project the beam toward a diffractive optical element (DOE) 34, which splits the beam into multiple diffraction orders, thus creating a pattern of spots extending over a certain angular range about axis 26. A cover window 36 of the device includes a filter 38, for example an infrared (IR) filter, in order to prevent light outside the optical working range from exiting and entering the device.

Rx camera 24 comprises an image sensor 40, comprising an array of sensing elements, which output electrical signals in response to incident light. Light collection optics 42 image the target scene onto image sensor 40, while a bandpass filter 44 blocks incoming light that is outside the emission band of Tx laser projector 22.

A processor 47 controls the operation of projector 22 (for example, setting the power level of emitter 30) and processes the signals output by image sensor 40. These processing functions include depth mapping of targets within the mapping span of device 20 and estimating distances to (or simply presence of) targets within the proximity sensing span, for example a target 46 that is shown in FIG. 1. Within the mapping span, processor 47 may apply any suitable method for pattern-based depth mapping that is known in the art, such as the method described in the above-mentioned U.S. Pat. No. 8,456,517. Methods for application by processor 47 in estimating distances within the proximity-sensing span are described hereinbelow.

Although the embodiments that are shown in the figures and described herein refer, for the sake of concreteness and clarity, to the particular design of device 20, the principles of the present invention may similarly be applied, mutatis mutandis, to other sorts of depth mapping devices with suitable pattern projection and imaging capabilities. All such alternative embodiments are considered to be within the scope of the present invention.

Figure 2:
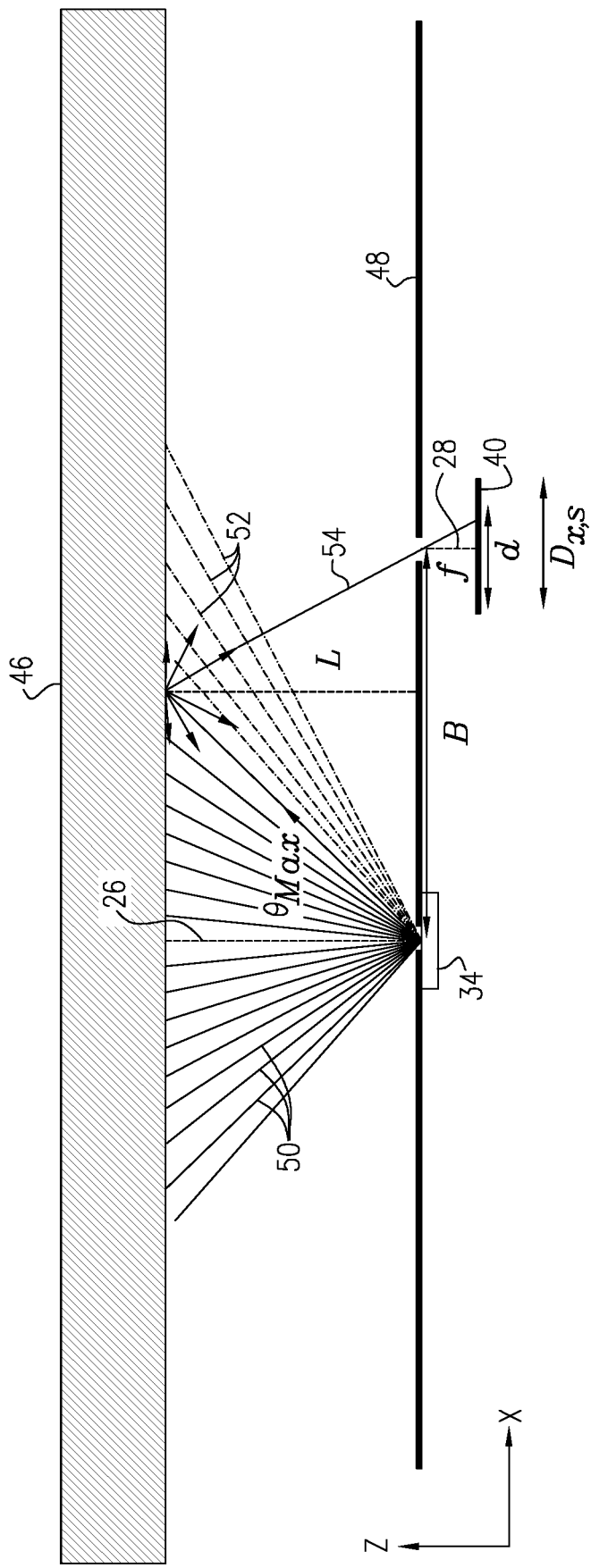
FIG. 2 is schematic detail view of the apparatus of FIG. 1, showing features and parameters used in proximity sensing, in accordance with an embodiment of the invention.

FIG. 2 is schematic detail view of device 20, showing features and parameters used in proximity sensing, in accordance with an embodiment of the invention. For purposes of depth mapping, DOE 34 creates an array of main diffraction orders 50, extending over an angular range @Max about projection axis 26. Diffraction orders 50 create corresponding spots on objects within the mapping span of device 20. In addition, due to practical limitations in the processes of design and manufacture, DOE 34 creates additional "spillover" orders 52, outside the range @Max. Spillover orders 52 are typically much weaker than main diffraction orders 50 and are not used in depth mapping.

Alternatively, DOE 34 may be designed to produce high diffraction orders of the desired strength outside the range $\theta_{Max}$, i.e., "spillover" orders are created intentionally, rather than as a byproduct of design and manufacturing limitations. For convenience in the description that follows, however, diffraction orders 52, beyond $\theta_{Max}$, are referred to as "spillover orders" regardless of how they are produced.

In the pictured example, target 46 is within the proximity-sensing span of device 20, at a distance L from a plane 48 of DOE 34. In this case, the spots formed on target 46 by most of main diffraction orders 50 will be outside the field of view of image sensor 40. The maximal main diffraction order 50, at the angle $\theta_{Max}$ relative to projection axis 26, will be imaged by a ray 54 onto a sensing element in image sensor 40 at a distance d from the inner boundary of the image sensor. The location at which ray 54 impinges on image sensor 40 corresponds to the edge of the angular range $\theta_{Max}$ on target 46. One or more neighboring diffraction orders 50 may be imaged onto image sensor 40 at greater distances from the inner boundary, depending on the distance L. On the other hand, for very small values of L, even ray 54 will be outside the field of view of the image sensor.

In some embodiments, processor 47 processes the signals output by image sensor 40 in order to extract the value d at which ray 54 impinges on the image sensor and to estimate the distance L to target 46 on this basis. By principles of triangulation, the distance is given by the formula:

$$L(d) = \frac{fB}{d + f \tan(\theta_{Max}) - \frac{D_{x,s}}{2}}$$

In this formula, f is the focal length of objective optics 42, and $D_{x,s}$ is the width of image sensor 40 along the X-direction.

Figure 3:
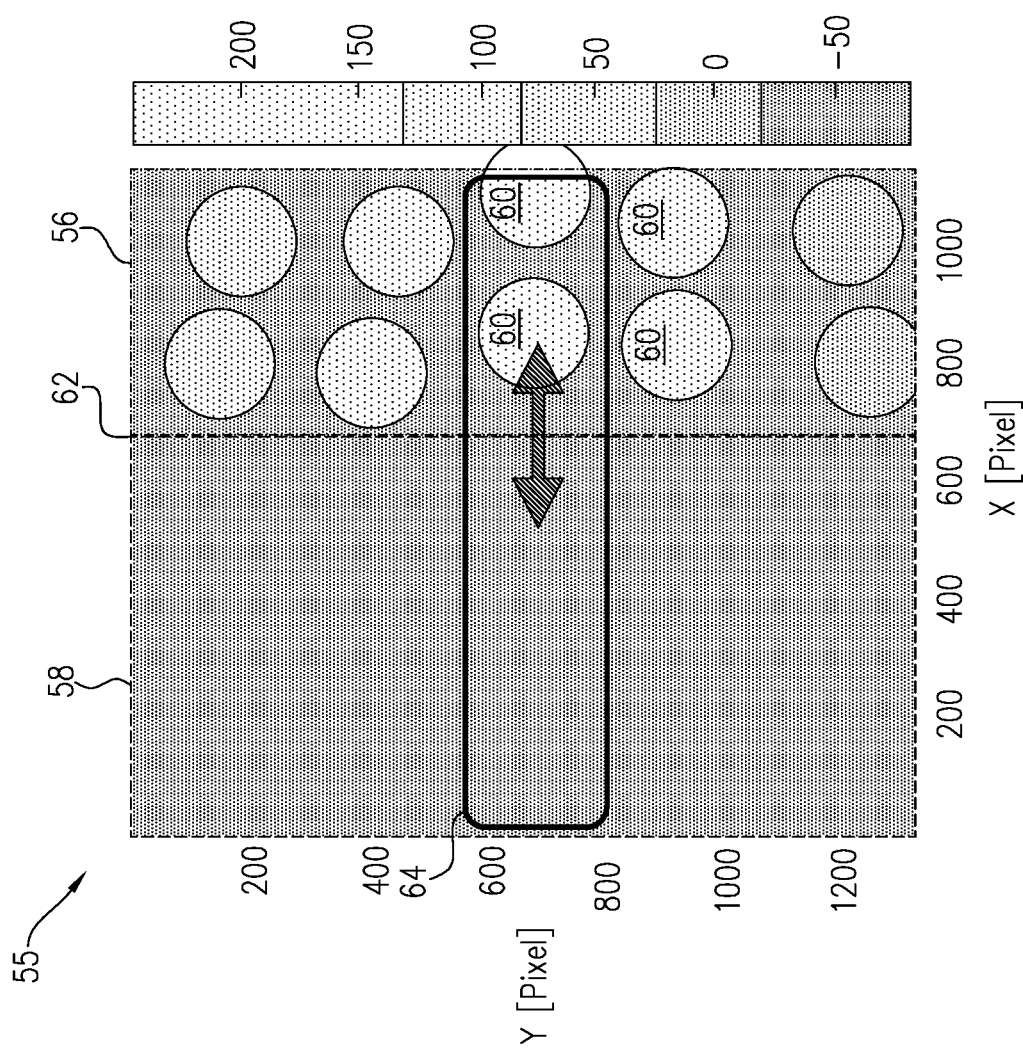
FIG. 3 is a schematic representation of an image captured by a camera in a depth and proximity sensing device, in accordance with an embodiment of the invention.

FIG. 3 is a schematic representation of an image 55 captured by camera 24, in accordance with an embodiment of the invention. Main diffraction orders 50 that impinge on target 46 are imaged to corresponding spots 60 in image 55. Spots 60 appear in an area 56 of the image corresponding to angles within the range $\theta_{Max}$, while spillover orders 52 outside this range do not form measurable spots in a remaining area 58 of the image. A boundary 62 between areas 56 and 58 corresponds to the edge of range $\theta_{Max}$, as defined by ray 54 (FIG. 2).

Because of the diffractive properties of DOE 34 and the characteristics of the optics in device 20 (FIG. 1), spots 60 lie along multiple "bars" 64 extending roughly in the X-direction at different Y-coordinates. Although spots 60 are defocused on image sensor 40 for short target distances L, processor 47 is able to recognize and make use of the features of bars 64 in estimating L, as described further hereinbelow. Alternatively or additionally, other characteristics of the array of spots 60 in images captured by camera 24 may be used for this purpose.

Proximity Sensing Using the Pattern Edge

Figure 4:
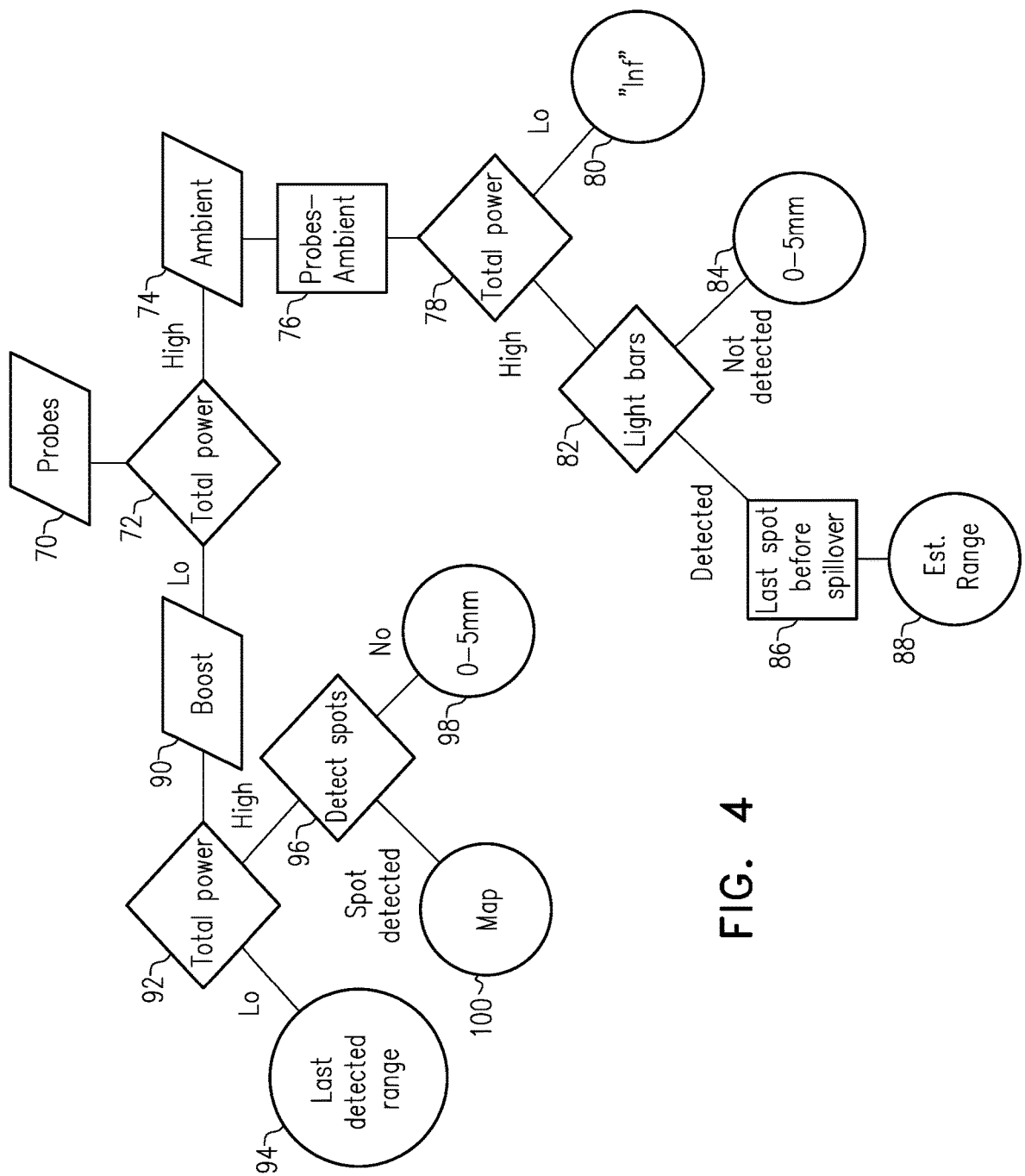
FIG. 4 is a flow chart that schematically illustrates a method for depth and proximity sensing, in accordance with an embodiment of the invention.

FIG. 4 is a flow chart that schematically illustrates a method for depth and proximity sensing, in accordance with an embodiment of the invention. Processor 47 initiates the method by actuating projector 22 for a short period, at a relatively low intensity, at a probe step 70. Processor 47 evaluates the total intensity of the resulting image captured at step 70 by camera 24, at a power measurement step 72. When the total is high, i.e., above a certain threshold, processor 47 checks the contribution of ambient light to the image, at an ambient assessment step 74. For this purpose, the processor turns off projector 22 and receives an image from camera 24 under ambient lighting only. The processor then subtracts the ambient light image, pixel by pixel, from the probe image captured at step 70, at an image subtraction step 76.

Processor 47 evaluates the total intensity of the subtracted image, at a difference power measurement step 78. When the total is low, i.e., below a certain threshold, the processor concludes that there is no target in proximity to device 20 (since the reflection the projected spots back to camera 24 is insignificant in comparison to the ambient background). In this case, processor 47 outputs an indication that the distance to the target is effectively "infinite," at an infinity output step 80.

When processor 47 finds at step 78 that the total intensity of the difference image is high, it processes the image to search for bars 64 of spots 60 (FIG. 3), at a bar identification step 82. The algorithm applied at this step is described in greater detail hereinbelow with reference to FIGS. 5A/B. If no such bars are detected, processor concludes that area 58, containing only spillover orders 52, covers the entire image, meaning that target 46 is very close to device 20, at a close-range detection step 84. In FIG. 4, this range is taken to be 0-5 mm, but the actual bounds of the range will depend on the geometrical and optical properties of the sensing device.

When bars 64 are detected at step 82, processor 47 applies an image processing algorithm to find the location of boundary 62 in image 55, corresponding to the last spot 60 before spillover and thus to the edge of the angular range $\theta_{Max}$ of main diffraction orders 50, at a boundary detection step 86. Processor 47 estimates the distance to target 46 by triangulation based on this location, at a range estimation step 88. The algorithm applied at this step is described in greater detail hereinbelow with reference to FIG. 5C. Processor 47 thus outputs the estimated distance to target 46.

Returning now to step 72, when processor 47 finds that the total intensity of the probe image is low, the processor actuates projector 22 at higher power and/or for a longer period, at a power boost step 90. Processor 47 measures the total intensity of the resulting image, at a boost power measurement step 92. When the total intensity is still too low to make a range measurement, processor 47 concludes that the target is undetectable (for example because it is too far from device 20 or its reflectivity is too low). In this case, the processor may output a default range measurement, such as the last detected range of the target, at a default output step 94.

When the total intensity measured at step 92 is above a minimal threshold, processor 47 processes the image captured at step 90 in order to search for spots in the image, corresponding to main diffraction orders 50, at a spot detection step 96. When no spots are detected, processor 47 again concludes that area 58, containing only spillover orders 52, covers the entire image, meaning that a target of low reflectivity is very close to device 20, at a close-range detection step 98. When processor 47 is successful in detecting spots at step 96, it compares the spot locations to a reference pattern, and thus creates a depth map of the target, at a mapping step 100.

Figure 5A:
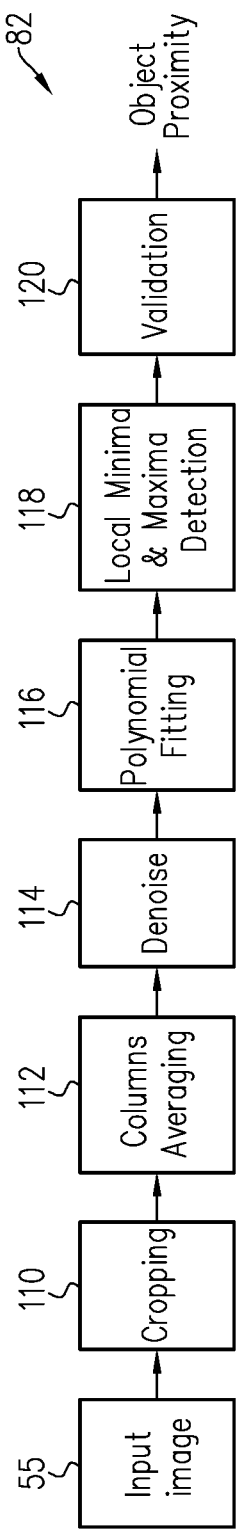
FIG. 5A is a flow chart that schematically illustrates a method for proximity sensing, in accordance with an embodiment of the invention.
Figure 5B:
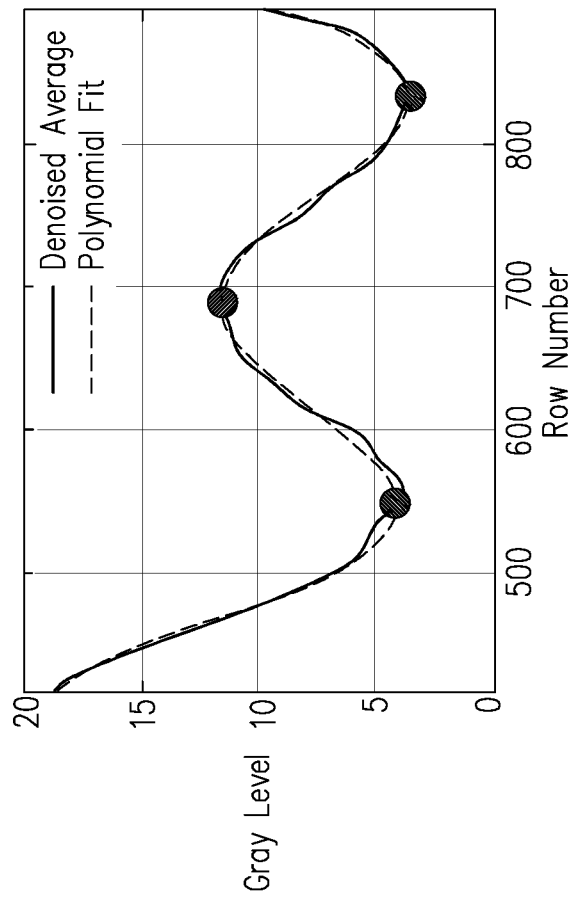
FIG. 5B is a plot that schematically illustrates a method for polynomial fitting used in the method of FIG. 5A, in accordance with an embodiment of the invention.

Reference is now made to FIGS. 5A and 5B, which schematically show details of bar identification step 82, in accordance with an embodiment of the invention. FIG. 5A is a flow chart showing details of an algorithm used in implementing step 82, while FIG. 5B is a plot that schematically illustrates a method for polynomial fitting that is used as a part of this algorithm. The algorithm finds the approximate location of the edge of the angular range $\theta_{Max}$ of main diffraction orders 50 (FIG. 2) by identifying local extrema in an intensity profile of image 55 (FIG. 3).

Processor 47 crops image 55 to define a region of interest, for example a window containing parts of boundary 62 and several bars 64 in the central part of the image, at a cropping step 110. Processor 47 averages the pixel intensities over the columns within the region of interest, at an averaging step 112. In other words, for each value of Y, processor 47 sums the pixel values along the X-direction to obtain a single, averaged intensity value. The processor denoises these averaged values to remove local spikes, for example by low-pass filtering, at a denoising step 114. The resulting denoised average values are shown by a solid line in FIG. 5B.

Processor 47 fits a polynomial, for example a suitable cubic or higher-order function, to the averaged intensity curve, at a fitting step 116. The fitted function is illustrated by the dashed line in FIG. 5B. To identify the columns of spots 60 and the intervening darker columns between the spots in image 55, processor 47 finds local maxima and minima in the polynomial curve, at an extrema finding step 118. Processor checks the pattern of maxima and minima to ascertain whether it corresponds to the expected characteristics of light bars 64, at a validation step 120. If not, target 46 is assumed to be very close to device 20, and the process continues to step 84 (FIG. 4). If stripes are detected at step 120, the process continues to step 86 to find the last spot 60 before spillover and thus estimate the actual distance to target 46.

Figure 5C:
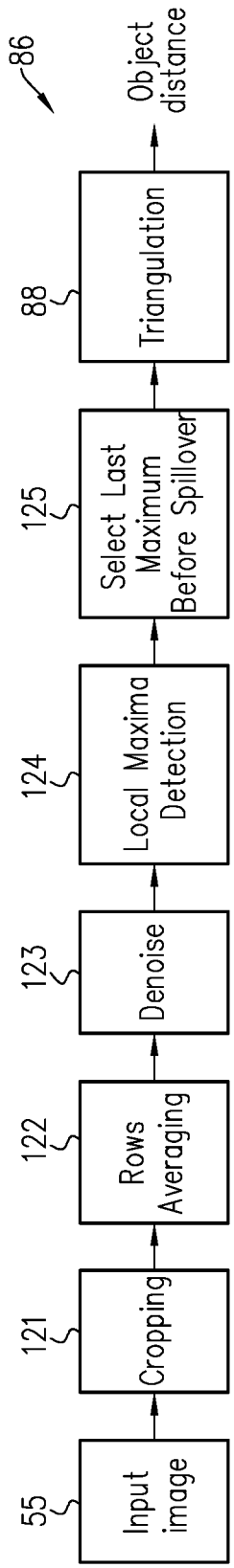
FIG. 5C is a flow chart that schematically illustrates a method for range estimation, in accordance with an embodiment of the invention.

FIG. 5C is a flow chart that schematically shows details of boundary detection step 86, in accordance with an embodiment of the invention. Processor 47 crops image 55 to define a region of interest, for example a window containing one or more of the bars 64 found at step 82, at a cropping step 121. Processor 47 averages the pixel intensities over the rows within the region of interest, at an averaging step 122. In this case, for each value of X, processor 47 sums the pixel values along the Y-direction to obtain a single, averaged intensity value. The processor denoises these averaged values to remove local spikes, for example by low-pass filtering, at a denoising step 123.

Processor 47 searches for local maxima in the averaged intensity curve, at a maxima detection step 124. The processor filters out local maxima that are below a certain threshold in order to eliminate local maxima that might arise due to spillover orders 52. Among the local maxima remaining after filtering, processor 47 selects the last local maximum before spillover, at a last maximum selection step 125. (In the geometry shown in FIG. 3, the leftmost local maximum, closest to boundary 62, is selected.)

Processor then estimates the distance to target 46 by a process of triangulation based on the location of this last local maximum (or equivalently, of boundary 62) in image 55, along with the offset B and other optical and geometrical features of device, as explained above, at triangulation step 88. The X-coordinate of this last local maximum is indicative of the value d at which ray 54 impinges on the image sensor 40 (FIG. 2) and thus can be used to find the distance L to target 46 using the triangulation formula presented above.

Alternatively, a process of approximation and optimization, for example by linear regression, can be applied to find the distance L with greater accuracy as a function of the locations of extrema in the averaged intensity. Further alternatively, other methods of image processing and approximation that are known in the art can be used to extract the edge of the angular range $\theta_{Max}$ of main diffraction orders 50 from spots 60 in image 55 and thus to estimate the distance L.

Proximity Sensing by Pattern Fitting

Figure 6A:
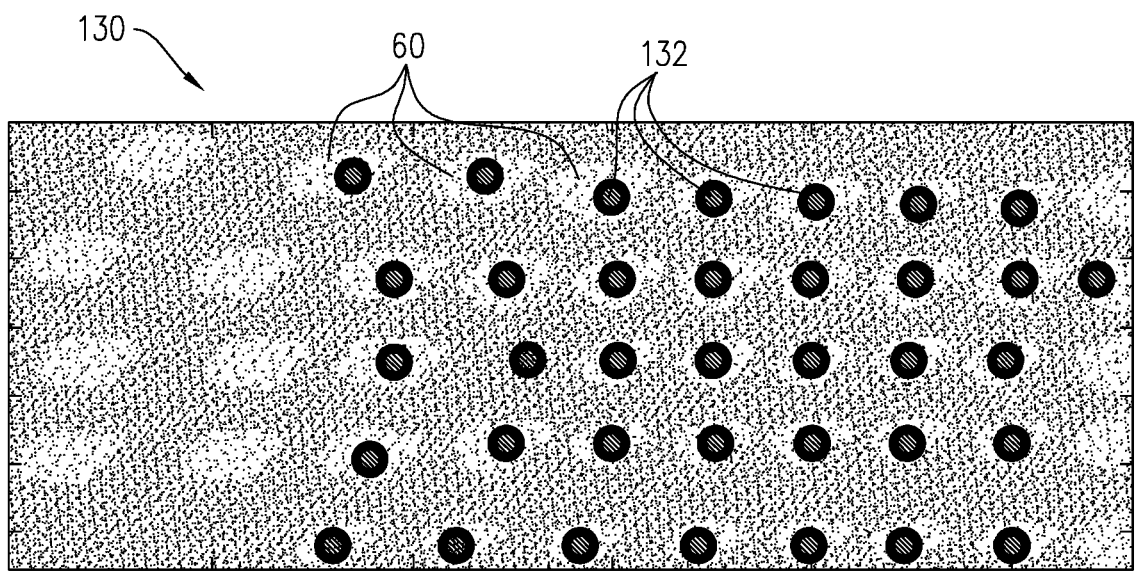
FIG. 6A is a schematic representation of an image of an array of spots captured by a camera in a depth and proximity sensing device, in accordance with another embodiment of the invention.
Figure 6B:
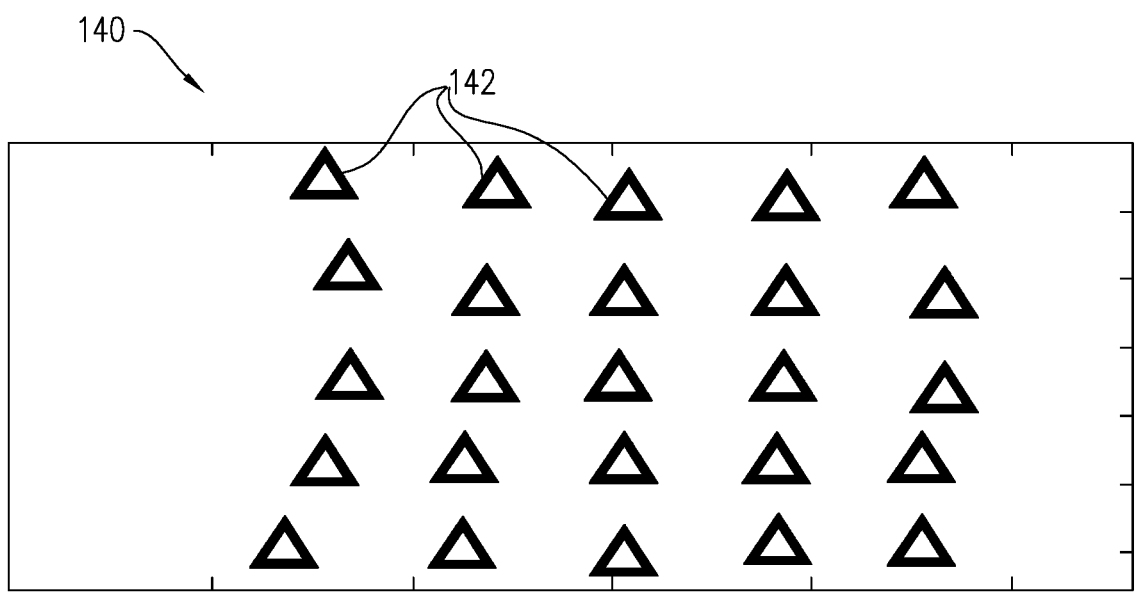
FIG. 6B is a schematic representation of a map of reference locations of spots projected to a certain range by a depth and proximity sensing device, in accordance with an embodiment of the invention.
Figure 6C:
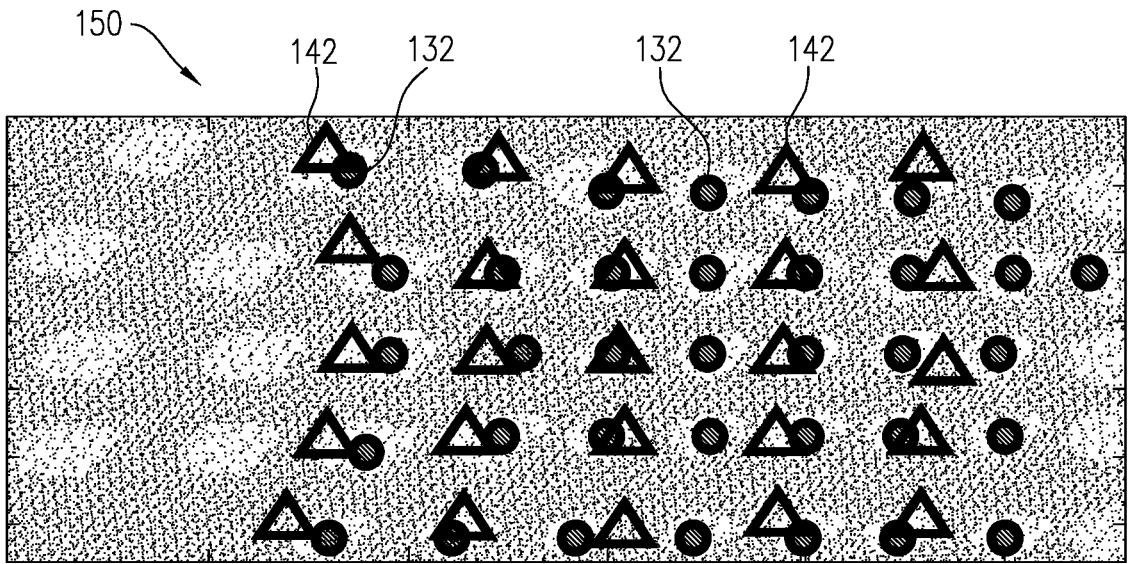
FIG. 6C is a superposition of the image of FIG. 6A with the map of FIG. 6B, showing the correspondence between the spots in FIG. 6A and the reference locations of FIG. 6C, in accordance with an embodiment of the invention.
Figure 6D:
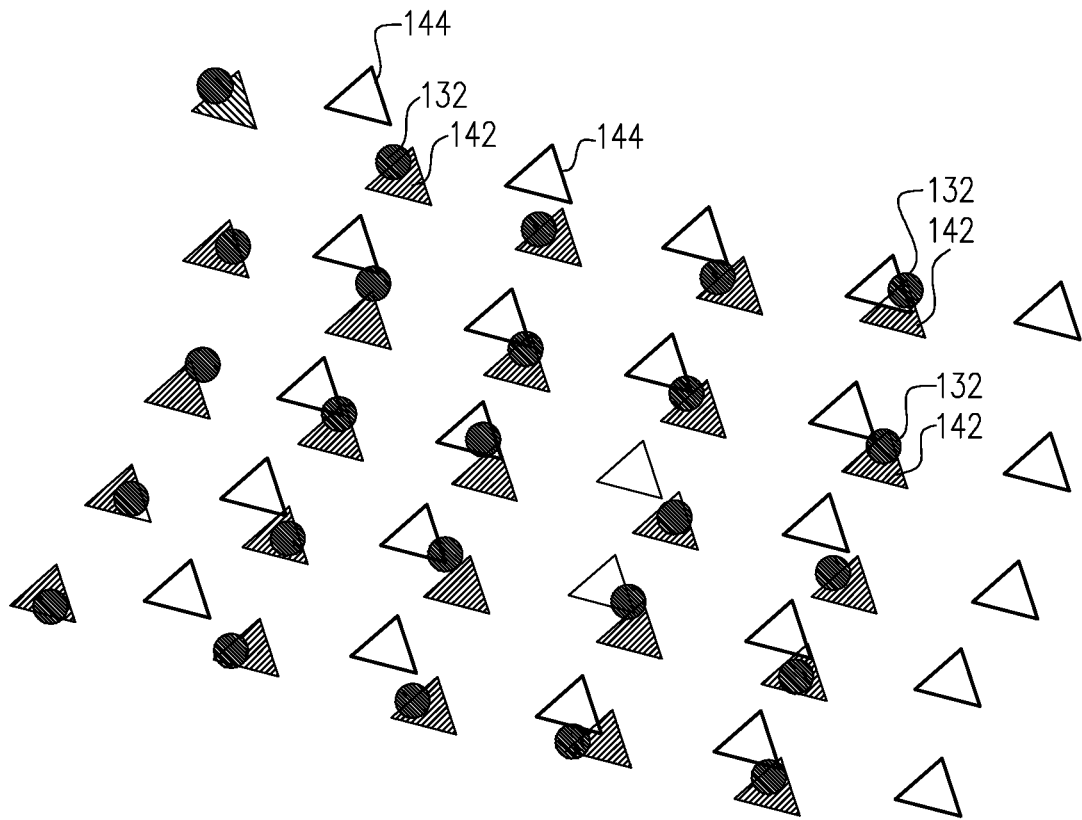
FIG. 6D is a schematic representation of an image of an array of spots captured by a camera, overlaid on a map of reference locations, in accordance with another embodiment of the invention.
Figure 7:
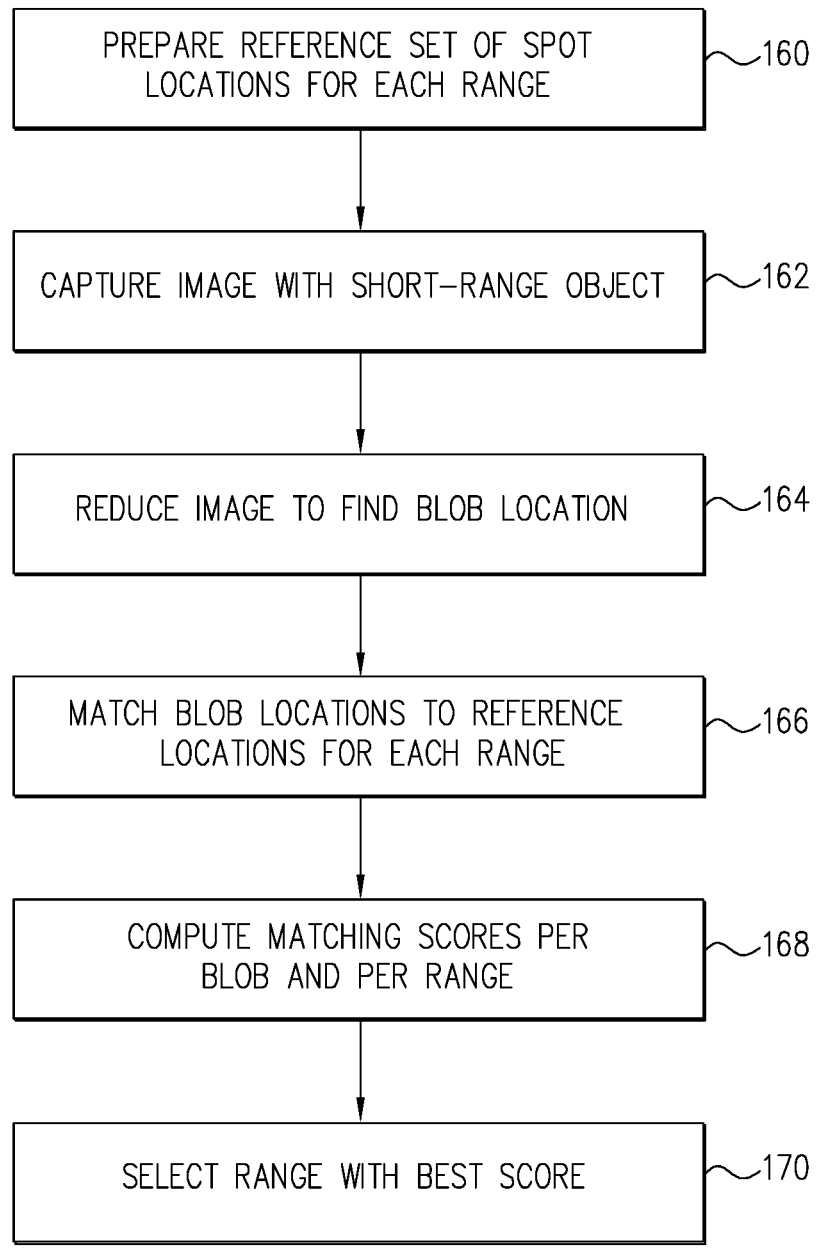
FIG. 7 is a flow chart that schematically illustrates a method for range estimation, in accordance with an alternative embodiment of the invention.

Reference is now made to FIGS. 6A-D and 7, which schematically illustrate a method for range estimation, in accordance with alternative embodiments of the invention. This method can be used in place of step 86 (FIG. 4) in finding the distance to target 46 within the span that is too short for pattern-based depth mapping. FIG. 6A shows an image 130 of an array of spots 60 captured by camera 24, while FIG. 6B shows a reference map 140 of reference locations 142 of spots projected to a certain distance L, and FIG. 6C is a superposition 150 of the image of FIG. 6A with the map of FIG. 6B. FIG. 7 is a flow chart showing the steps in the method. FIG. 6D is a schematic representation of locations 132 of an array of spots in an image captured by camera 24, overlaid on a map of reference locations 142, in accordance with another embodiment of the invention.

In the present embodiments, processor 47 stores reference data indicating respective expected locations in an image (for example, in image 55 as shown in FIG. 3) of spots 60 at the edge of the angular range $\theta_{Max}$ of main diffraction orders 50 for different possible values of the distance L to target 46 within the proximity sensing span. Processor 47 then estimates the actual value of the distance to the target by matching the actual locations of the spots in image 55 to the expected locations of the spots in the stored reference data.

In preparation for execution of this method, processor 47 stores reference data for multiple different values of the target distance, at a reference storage step 160. The reference data for each distance value comprise a set of reference locations 142 of the spots that are created at this distance by main diffraction orders 50, as illustrated in map 140 (FIG. 6B). Reference locations 142 indicate the expected locations of the spots in an image captured by camera 24 at each value of the target distance and may be calculated, for example, using a suitable optical simulator, or alternatively, they may be measured empirically during calibration of device 20.

Camera 24 captures an image of target 46 at a location close to device 20, for example image 130 (FIG. 6A), at an image capture step 162. Spots 60 appear in this image as "blobs," i.e., connected groups of pixels whose shape is irregular and whose edges may not be clearly defined. Processor 47 finds respective locations 132 of these blobs in the image, at a location finding step 164. For this purpose, for example, processor 47 may apply one or more quantization thresholds to the image data in order to reduce the number of bits per pixel and improve the image contrast, and then may identify the centroids of these reduced blobs as locations 132.

Processor 47 superposes blob locations 132 on reference locations 142 for two or more of the values of the distance of the reference data (as shown in FIG. 6C, for example) and matches each blob location to a corresponding reference location in each of these superpositions, at a blob matching step 166. To estimate the distance to the target, processor 47 finds respective displacements between the actual blob location 132 and the corresponding reference location 142 of each of the spots and selects the value of the distance L to target 46 that minimizes these displacements.

For this purpose, in the present embodiment, processor 47 computes respective scores for two or more of the values of the distance based on the respective displacements, at a scoring step 168. The score for each candidate distance value L can be computed, for example, as a weighted sum of the inverse displacements di between the pairs of actual and reference blob locations for all blobs i:

$$\text{Score}(L) = \sum_i w_i/\delta_i$$

wherein $w_i$ is the respective weight for each blob (which may be the same for all blobs). Processor 47 chooses the value of the distance L having the best score, meaning the highest score according to the above formula, at a range selection step 170. This is the distance at which the expected locations of the spots optimally match the actual locations.

Errors may occur in the computation of step 168 when a given blob location 132 falls between a pair of neighboring reference locations 142. It may occur as a result that the estimated location of the blob receives a better score for an incorrect reference location than for the correct reference location.

FIG. 6D illustrates an alternative arrangement of the projected spots that can help to mitigate this potential problem. In the embodiment of FIG. 6D, the spots in the projected pattern are arranged along rows that are angled obliquely relative to the baseline direction, i.e., relative to the X-axis in device 20 (FIGS. 1 and 2), which is the direction of offset between projection axis 26 and imaging axis 28. (The term "obliquely" means that the rows of spots are neither parallel nor perpendicular to the baseline direction.) The oblique arrangement of the spots can be achieved by appropriate design of DOE 34 or simply by rotating the DOE relative to the baseline direction. For example, the rows of spots may be angled by 10° or more relative to the X-axis, which is the horizontal direction in FIG. 6D.

As a consequence of the oblique arrangement of the projected spots, reference locations 142 shift obliquely—both vertically and horizontally in the X-Y plane—with increasing diffraction order, as illustrated in FIG. 6D. Blob locations 132 will shift obliquely, as well, with increasing diffraction order. The displacements $\delta_i$ between the pairs of actual and reference blob locations will take into account both horizontal and vertical displacement components. Therefore, the probability of an incorrect match at step 170, for example to shifted reference locations 144 in FIG. 6D, is reduced, and the accuracy of range estimation at short distances is enhanced.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Sensing apparatus, comprising:
   a projector, which is configured to project toward a target a pattern of spots extending over a predefined angular range about a projection axis;
   an imaging assembly, comprising an image sensor and objective optics, which are configured to form on the image sensor an image of the target along an imaging axis, which is offset transversely relative to the projection axis; and
   a processor, which is configured to process signals output by the image sensor so as generate, while the target is within a first span of distances from the apparatus, a depth map of the target responsively to shifts of the spots in the image, and to estimate, while the target is within a second span of distances, nearer to the apparatus than the first span, a distance to the target from the apparatus by detecting in the image a part of the pattern located at an edge of the angular range,
   wherein the processor is configured to find, responsively to the detected part of the pattern, a location of the edge of the angular range in the image, and to estimate the distance to the target within the second span responsively to the location of the edge by a process of triangulation based on the location of the edge in the image and an offset between the projection axis and the imaging axis.

2. The apparatus according to claim 1, wherein the processor is further configured to detect, when the pattern is absent from the image, that the target is located within a third span of distances, nearer to the apparatus than the second span.

3. The apparatus according to claim 2, wherein within the second span of the distances, the image contains bars formed by the spots projected onto the target, and wherein the processor is configured to detect whether the target is in the second span or the third span of the distances responsively to a presence or absence of the bars in the image.

4. The apparatus according to claim 1, wherein the projector comprises a diffractive optical element (DOE), and wherein the spots correspond to respective diffraction orders of the DOE.

5. The apparatus according to claim 1, wherein the processor is configured to find the location of the edge by identifying one or more local extrema in an intensity profile of the image.

6. Sensing apparatus, comprising:
a projector, which is configured to project toward a target a pattern of spots extending over a predefined angular range about a projection axis;
an imaging assembly, comprising an image sensor and objective optics, which are configured to form on the image sensor an image of the target along an imaging axis, which is offset transversely relative to the projection axis; and
a processor, which is configured to process signals output by the image sensor so as generate, while the target is within a first span of distances from the apparatus, a depth map of the target responsively to shifts of the spots in the image, and to estimate, while the target is within a second span of distances, nearer to the apparatus than the first span, a distance to the target from the apparatus by detecting in the image a part of the pattern located at an edge of the angular range,
wherein the processor is configured to store reference data indicating respective expected locations in the image of the spots at the edge of the angular range for each of a plurality of values of the distance within the second span, and to estimate the distance to the target within the second span by matching actual locations of the spots in the image of the pattern to the expected locations of the spots in the stored reference data.

7. The apparatus according to claim 6, wherein the processor is configured to find respective displacements between the actual locations and the expected locations of each of the spots for two or more of the values of the distance of the reference data, and to select a value of the distance to the target responsively to the respective displacements.

8. The apparatus according to claim 7, wherein the processor is configured to compute respective scores for the two or more of the values of the distance based on the respective displacements, and to choose the value of the distance, responsively to the respective scores, at which the expected locations of the spots optimally match the actual locations.

9. The apparatus according to claim 6, wherein the imaging axis is offset relative to the projection axis along a baseline direction, and wherein the spots in the projected pattern are arranged along rows that are angled obliquely relative to the baseline direction.

10. A method for sensing, comprising:
projecting from a projector toward a target a pattern of spots extending over a predefined angular range about a projection axis;
capturing an image of the target along an imaging axis, which is offset transversely relative to the projection axis; and
processing the image so as generate, while the target is within a first span of distances of the projector, a depth map of the target responsively to shifts of the spots in the image, and to estimate, while the target is within a second span of distances, nearer to the projector than the first span, a distance to the target by detecting in the image a part of the pattern located at an edge of the angular range,
wherein processing the image comprises finding, responsively to the detected part of the pattern, a location of the edge of the angular range in the image, and estimating the distance to the target within the second span by applying a process of triangulation based on the location of the edge in the image and an offset between the projection axis and the imaging axis.

11. The method according to claim 10, wherein processing the image comprises detecting, when the pattern is absent from the image, that the target is located within a third span of distances, nearer to the projector than the second span.

12. The method according to claim 11, wherein within the second span of the distances, the image contains bars formed by the spots projected onto the target, and wherein processing the image comprises detecting whether the target is in the second span or the third span of the distances responsively to a presence or absence of the bars in the image.

13. The method according to claim 10, wherein the projector comprises a diffractive optical element (DOE), and wherein the spots correspond to respective diffraction orders of the DOE.

14. The method according to claim 10, wherein processing the image comprises storing reference data indicating respective expected locations in the image of the spots at the edge of the angular range for each of a plurality of values of the distance within the second span, and estimating the distance to the target within the second span by matching actual locations of the spots in the image of the pattern to the expected locations of the spots in the stored reference data.

15. The method according to claim 14, wherein estimating the distance comprises finding respective displacements between the actual locations and the expected locations of each of the spots for two or more of the values of the distance of the reference data, and selecting a value of the distance to the target responsively to the respective displacements.

16. The method according to claim 14, wherein the imaging axis is offset relative to the projection axis along a baseline direction, and wherein the spots in the projected pattern are arranged along rows that are angled obliquely relative to the baseline direction.

* * * * *